US005746915A

United States Patent [19]

Ebeling

[11] Patent Number: 5,746,915

[45] Date of Patent: May 5, 1998

[54] CENTRIFUGE WITH A DRIVE UNIT AND AN ENDLESS DRIVE MEANS

[75] Inventor: Ralf-Martin Ebeling, Brunswick, Germany

[73] Assignee: Braunschweigische Maschinenbauanstalt AG, Brunswick, Germany

[21] Appl. No.: 621,814

[22] Filed: Mar. 22, 1996

[30] Foreign Application Priority Data

Mar. 24, 1995 [EP] European Pat. Off. .............. 95104399

[51] Int. Cl.$^{6}$ ................................ B04B 1/06; F16H 7/12

[52] U.S. Cl. ......................... 210/363; 210/360.1; 494/36; 494/43; 494/82; 474/113; 474/117

[58] Field of Search ................................ 210/360.1, 363, 210/376, 378, 379; 494/36, 43, 82, 84; 474/113, 137

[56] References Cited

U.S. PATENT DOCUMENTS

| | | |
|---|---|---|
| 3,463,022 | 8/1969 | Miller . |
| 4,640,770 | 2/1987 | Smith . |
| 5,244,502 | 9/1993 | Schaper et al. . |

FOREIGN PATENT DOCUMENTS

| | | |
|---|---|---|
| 0311791 | 4/1989 | European Pat. Off. . |
| 640787 | 1/1937 | Germany . |
| WO 93/10373 | 5/1993 | WIPO . |

*Primary Examiner*—David A. Reifsnyder

*Attorney, Agent, or Firm*—W. G. Fasse; W. F. Fasse

[57] ABSTRACT

A centrifuge includes an elastically supported centrifuge basket, a drive unit, and an endless drive arrangement, such as a drive belt arranged on a drive pulley of the drive unit and a driven pulley of the centrifuge basket support unit, for driving the centrifuge basket. A tension relieving device is provided for relieving or counteracting the tension forces of the endless drive arrangement. Thus the elastic supporting members of the centrifuge basket support unit are not stressed by the tension forces of the endless drive arrangement, and the tension relieving device can be pre-stressed so that the basket is in a neutral position during operation. For pre-stressing the tension relieving device, it includes an elastic thrust element, such as a compression spring packet, in addition to a length adjustable strut. To avoid tilting moments, the tension relieving device is arranged in a plane of the endless drive arrangement between the two pulleys.

23 Claims, 1 Drawing Sheet

CENTRIFUGE WITH A DRIVE UNIT AND AN ENDLESS DRIVE MEANS

FIELD OF INVENTION

The invention relates to a centrifuge with an elastically supported centrifuge basket, a drive unit that drives the centrifuge basket through an endless drive means, and tension relieving means arranged in the plane of the endless drive means for relieving the tension forces generated by the endless drive means.

BACKGROUND INFORMATION

In the sugar industry, for example, continuously operating centrifuges are well known. Such centrifuges have an elastically supported centrifuge basket, whereby the elastic support bearing assembly is intended to isolate oscillations that result from imbalances (e.g. uneven distribution) acting on the basket and vibrations caused thereby. It is known to provide a flexible connection between the support of the centrifuge basket and the centrifuge housing to decouple the oscillations or vibrations of the centrifuge basket so that they are not transmitted to the surrounding machine components. Vibration-damping bonded rubber mounting pads (rubber buffers) are used to provide such an elastically damping connection.

Furthermore, endless drive means such as V-belt drives are typically employed for the drive force transmission. However, such endless drive means are known to exert on the supporting bearing a large lateral force in the form of pre-tensioning and drive forces of the endless drive element. The lateral force resulting from the pre-tensioning and drive forces effects a displacement of the centrifuge basket. As a result, the oscillation or vibration damping elements are put under stress, which leads to a considerably less effective isolation of oscillations and vibrations, and furthermore greatly shortens the useful service life of the damping elements, especially when bonded rubber mounting pads (rubber buffers) are used therefor.

In order to solve this problem it is known in the art to decouple the pre-tensioning and drive forces of the endless drive from the elastic support of the centrifuge basket by providing an auxiliary shaft. This auxiliary shaft is rigidly supported similarly to the drive unit, so that the V-belt pulleys have a defined spacing therebetween. The auxiliary shaft transmits the drive moments in an axial direction through an oscillation isolating coupling into the shaft of the elastically supported centrifuge basket. This arrangement is very complicated and cost intensive, however. The auxiliary shaft requires a corresponding supporting bracket and must be supported by at least two support bearings. Furthermore, the axial positioning of the auxiliary shaft relative to the shaft of the centrifuge basket is extremely important for achieving a low-wear operation of the centrifuge. Therefore, the adjustment procedures are correspondingly complicated and costly.

Moreover, U.S. Pat. No. 4,640,770 (Smith) discloses a batch-type centrifuge system, wherein the centrifuge basket is mounted at one end of a rotatable shaft, and a universal- or gimbal-type suspension is provided at the other end of the shaft. The shaft is supported in an elongated bearing, and the bearing and therewith the shaft are elastically supported on a fixed base frame near the centrifuge basket by means of a supporting structure. The gimbal-type support at the end of the shaft opposite the centrifuge basket allows the basket to tilt about two mutually perpendicular axes that are orthogonal to the shaft. However, the centrifuge basket is not freely movable in lateral directions. In other words, deflection motions in directions axial and radial to the shaft are prevented by the universal- or gimbal-suspension. Therefore, it is disadvantageous that forces generated in the centrifuge basket are necessarily transmitted through the universal- or gimbal-joint, whereby the lateral portion of the deflection forces acts directly upon the bearing of the universal- or gimbal-joint, and an increased wear results therein.

A similar arrangement is disclosed by European Patent Application Publication EP 0 311 791 A2, wherein a centrifuge with a vertical centrifuge spindle has a universal-type joint at the end of the centrifuge spindle opposite the centrifuge basket. The drive between the drive unit and the centrifuge spindle is achieved through a drive belt. Similarly as in U.S. Pat. No. 4,640,770, the universal-joint axis arranged perpendicularly to the tension force direction of the drive belt engaging the spindle axis is oriented in the horizontal central plane of the driven belt pulley that is mounted on the spindle.

German Patent 640 787 discloses a pendulum-type suspended centrifugal machine with a drive motor connected to the centrifuge basket by a drive belt, wherein the drive motor is rigidly connected by a support arm to the shaft support bearing of the basket. The centrifugal machine and the drive motor are universally movably suspended. The drive belt tension is adjustable by slidingly moving the drive motor on the support arm. It is disadvantageous that the vibrations originating from the basket are transmitted through the support arm directly to the drive motor.

International PCT Publication WO 93/10373 discloses a tension relieving device for belt drives, wherein the pre-tensioning and drive forces acting on the belt pulley shafts are taken up by at least one compression strut arranged between the drive shaft and the driven shaft. Preferably two struts are arranged respectively to either side of each drive belt. The compression strut consists of an elongated tube and two eye loops having opposite handed threads screwed onto the opposite ends of the tube. Each eye loop has a bearing therein in which the respective drive pulley shafts are supported. By rotating the elongated tube, the shaft spacing is adjustable, but does not allow any motion of one shaft.

U.S. Pat. No. 3,463,022 (Miller) discloses an adjustment device for tensioning a chain drive, wherein a piston rod extends from a cylinder and engages a chain tensioning roller. The piston rod is, for example, pre-stressed by a compression spring arranged in the cylinder chamber. Such a device would not be suitable for use in contrifuge drives, because it does not allow movements in all directions.

SUMMARY OF THE INVENTION

In view of the above discussion it is an object of the invention to provide a centrifuge with an elastically supported centrifuge basket, a drive unit that drives the centrifuge basket through an endless drive means, and tension relieving means for the tension forces generated by the endless drive means, wherein the centrifuge basket can move with all possible degrees of freedom.

The above object and others have been achieved by the present centrifuge, wherein the tension relieving means are arranged between the deflection guide means of the endless drive means and comprise an elastic thrust element. The present tension relieving device serves to compensate the drive and pre-tensioning forces of the endless drive means with a counter-force. As a result the elastic support of the centrifuge basket is not placed under stress, so that a dislocation of the rotating basket relative to the stationary centrifuge feed intake also does not arise. Thereby, the service life of the elastic support of the centrifuge basket is increased. Moreover, simple oscillation or vibration dampers, such as bonded rubber mounting pads (rubber buffers), for example, can be used. Since the shaft of the centrifuge basket is not fixed to a point in space, for example by a universal-type joint, up and down motions or lateral dislocations are not positively prevented, but rather elastically spring-damped. The centrifuge basket is elastically deflectable in all directions of motion on the elastic oscillation dampers. Especially, due to imbalances, the centrifuge basket can oscillate up and down or be displaced laterally to the sides (as well as tilt around its horizontal axis). The wear on the support bearing elements of the centrifuge basket is thereby reduced.

The tension relieving device arranged according to the invention enable a reliable adjustment and re-tightening of the endless drive means. The structural height of the present centrifuge design can be considerably reduced in comparison to typical constructions using an auxiliary or intermediate transmission shaft. This not only decreases the costs and reduces the space requirement of the total apparatus, but the operation and maintenance thereof also becomes simpler, because the from-above accessibility of the entire centrifuge is substantially improved. The tension relief is effective in the plane of the endless drive means, whereby the line of effect aligns with the driving and driven shafts. In this manner, the tension relieving means act exactly counter to the drive and pre-tensioning forces caused by the endless drive means, without giving rise to a further stressing or tilting moment. Thus, the elastic suspension of the centrifuge basket is not unilaterally loaded even during operation of the centrifuge, so that the service life of the oscillation or vibration dampers is increased. The elastic thrust element elastically counter-supports the drive and pre-tensioning force caused by the endless drive means, and thereby decouples the centrifuge basket from the drive as far as oscillations and vibrations are concerned.

An especially good decoupling of the centrifuge basket from the surroundings is achieved if the endless drive means is a belt drive. A drive belt operates without disturbance even in the event of imbalances and vibrations of the centrifuge basket.

Since the elastic thrust element of the present tension relieving device comprises at least one compression spring or a compression spring packet, preferably embodied as helical springs, or a rubber spring, an ideal oscillation decoupling of the drive unit from the centrifuge basket is achieved. The compression spring or the compression spring packet generates the counter-force necessary for compensating the drive and pre-tensioning forces of the endless tension means. The compression spring packet is the more compact embodiment, which can thus reduce the space requirement to the greatest extent, The use of rubber springs alternatively would have the advantage, through self-damping, of also avoiding different spring stiffnesses in the two regions right/left on the one hand and front/back on the other hand. Moreover, both preferred alternatives have the advantage that they do not require any guide or auxiliary elements, which could otherwise limit the freedom of motion, The tension relieving device further comprises a strut, of which one end is secured to the drive unit and the other end is connected through the elastic thrust element to the elastically supported centrifuge basket. The connection of the strut to the drive unit is preferably embodied to allow an axial adjustment of the strut. This arrangement of a strut in series with an elastic thrust element provides an ideal force connection between the drive unit and the elastically supported centrifuge basket.

If a strut of substantial length is used, it could be necessary to support the strut on an intermediate bearing member. Preferably, the strut is held by the intermediate bearing member in a slidable, but rotationally secured manner, for example by means of a spring engaging into an axial groove.

In order to apply tension to the endless drive means, especially the V-belt, the drive unit is embodied to be slidable on a motor base, for example by means of elongated holes. After the pre-tensioning of the V-belt, the drive unit is again securely bolted onto the motor base. The pre-tensioning is preferably carried out by means of an adjustment nut on a threaded section of the strut of the tension relieving device. Thereafter, the mean drive force that will be transmitted from the drive motor through the V-belt drive to the centrifuge basket can be pre-adjusted by further pre-stressing the elastic thrust element by further adjusting the nut on the threaded section of the strut. Thereby, the elastically supported centrifuge basket is essentially in its neutral position during operation of the centrifuge, in other words the elastic support of the centrifuge basket is stress-free and acts in an ideally oscillation decoupled manner.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
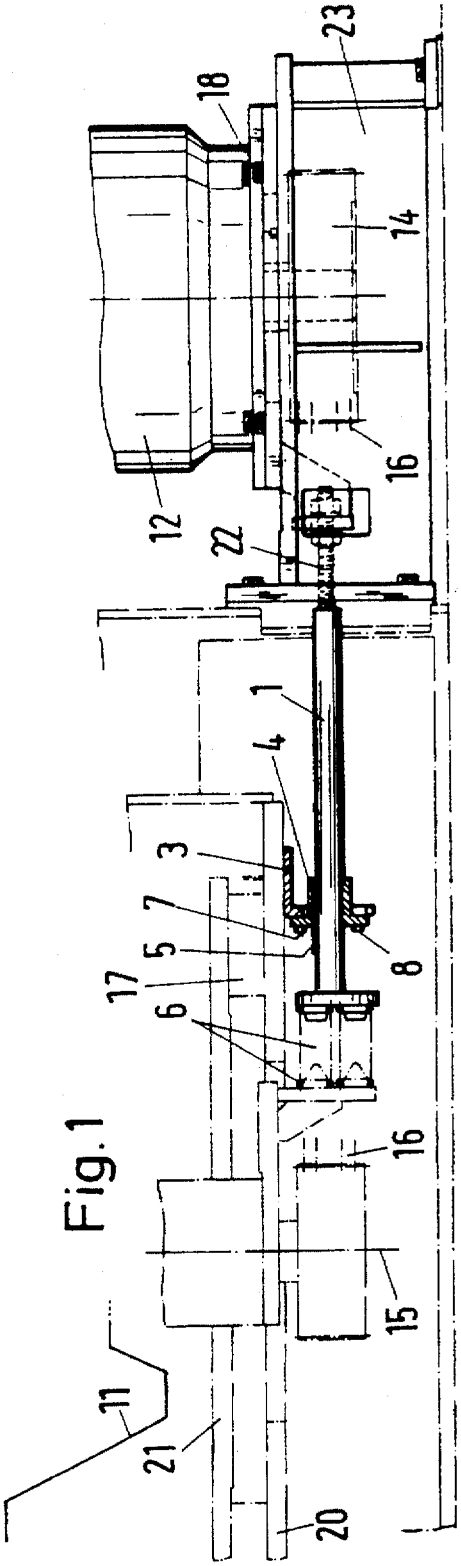
FIG. 1 shows a side view, partially sectioned, of the centrifuge drive according to the invention.

FIG. 1 shows a part of a continously operating centrifuge with an elastically supported centrifuge basket 11 and a drive unit (electric motor) 12. The basket 11 is shown purely schematically in a completely different scale mainly for orientation purposes. A drive wheel, especially a V-belt pulley 14, is secured to an output shaft of the drive unit 12. A driven wheel, especially a V-belt pulley 15, is rigidly connected to a bearing shaft of the centrifuge basket 11. A V-belt 16 runs between the two pulleys 14 and 15, whereby the drive unit 12 drives the basket 11. The centrifuge basket 11 is rotatably held on a bearing assembly 21. The basket bearing assembly 21 is connected with a base plate 20 by means of bonded rubber mounting pads 17.

Bolts or screws 18 pass through and cooperate with elongated holes to securely yet adjustably connect the drive unit 12 with the motor base 23.

A tension relieving device 19 is arranged exactly in the line connecting the two reversal deflection points of the V-belt 16, in other words in the intersection line of the plane defined by the two axes of the V-belt pulleys 14 and 15 and the plane spanned by the V-belt 16. The tension relieving device 19 comprises a compression rod or strut 1 and an elastic thrust element 6. A first end of the strut 1 is connected to the motor bracket plate 2 of the drive unit 12, which is slidable in elongated holes as described above. The opposite second end of the strut 1 is connected with one end of the elastic thrust element 6. The other end of the elastic thrust element 6 is connected with the elastically supported bearing assembly 21. The elastic thrust element 6 comprises a spring packet of three compression springs, or alternatively rubber spring members, arranged parallel to one another.

Figure 2:
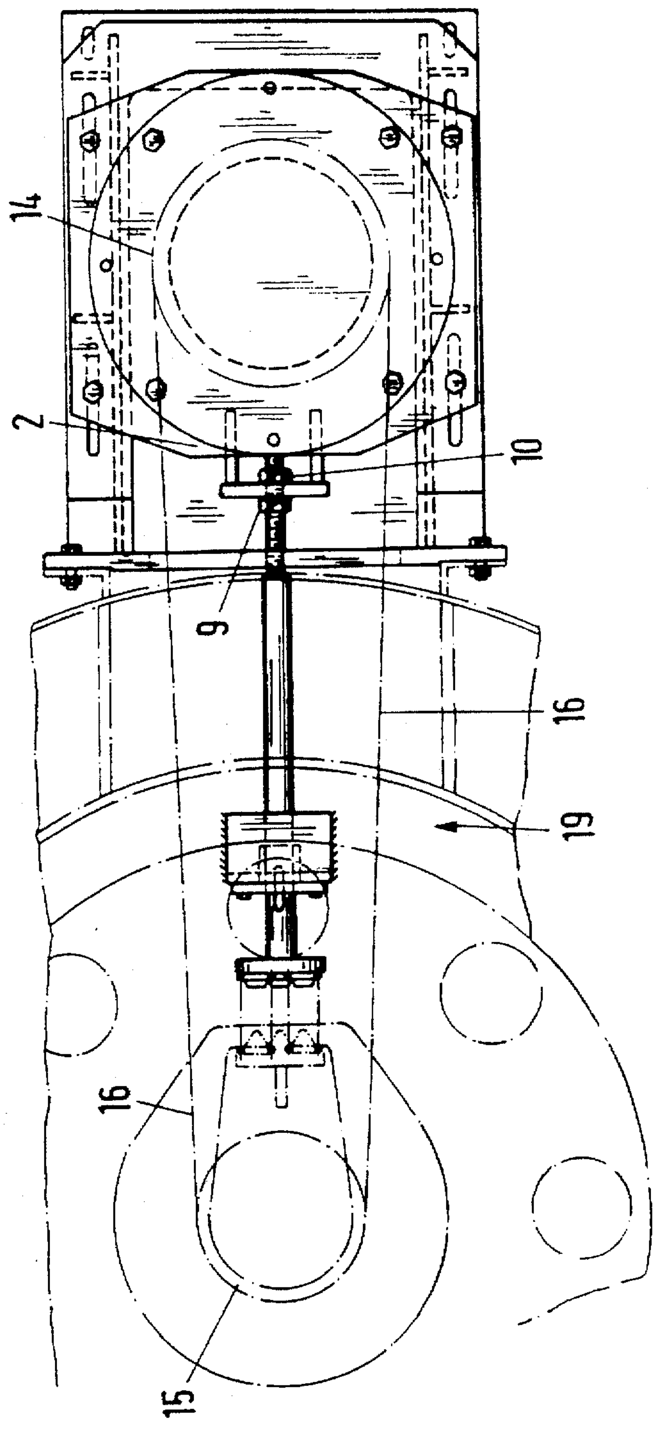
FIG. 2 shows a top view onto the centrifuge drive according to FIG. 1.

The elastic thrust element 6 provides the counter-force directed counter to the drive and pre-tensioning forces of the V-belt. In order to adjust this counter-force, as shown in FIG. 2, a threaded section 22 is provided on the first end of the strut 1 directed toward the drive unit 12. Nuts 9 and 10 are threaded onto the threaded section 22, and receive therebetween a bracket member of the drive unit. In this manner, the effective axial length of the strut 1 can be adjusted by turning the nuts 9 and 10, and as a result the spring packet of the elastic thrust element 6 can be pre-stressed, e.g. pre-compressed, as desired.

In order to ensure the centered position of the strut 1, and to avoid a dislocating deflection of the strut, an intermediate bearing member 3 is provided near the second end of the strut 1 directed away from the drive unit 12. The strut 1 is held in the intermediate bearing member 3 in a centered, yet axially slidable manner. The intermediate bearing member 3 is secured on the centrifuge base plate 20. A slide bearing sleeve 4 is arranged on the intermediate bearing member 3 in order to hold the strut 1 supported therein in an easily slidable manner. The slide bearing sleeve 4 is attached to the intermediate bearing member 3 by bolts or screws 7 and 8. An axis-parallel groove is provided on the inner surface of the bore of the slide bearing sleeve 4, and a complementing axis-parallel groove is provided in the surface of the strut 1. A spring element 5 is arranged to reach into and engage the two grooves. In this manner, the strut 1 is held in a rotationally secured yet axially slidable manner.

The tension relieving device of the centrifuge according to the invention is adjusted in the following manner. First, the drive unit 12 is loosened from the motor base 23 by loosening the bolts 18. Thereby, the drive unit 12 is slidable with its motor bracket plate 2 along elongated holes located therein. Then the V-belt 16 is loosely placed onto the V-belt pulleys 14 and 15. Then the V-belt 16 is tensioned by pre-stressing the elastic thrust element 6 by adjusting the nuts 9, 10 on the threaded section 22 of the strut 1.

The now correctly pre-tensioned V-belt 16 defines the axial spacing between the drive unit 12 and the centrifuge basket 11. The elastic bonded rubber mounting pads 17 hold the centrifuge bearing assembly 21 and therewith the centrifuge basket 11 in its unloaded neutral position. The motor base plate 2 of the drive unit 12 has been slidingly displaced along the motor base 23 in the elongated holes of the motor bracket plate 2, corresponding to the pre-tensioning of the V-belt 16. Now the drive unit 12, or rather the motor base plate 2, is securely connected to the motor base 23 by tightening the bolts 18.

Thereafter, the drive force effective between the drive unit 12 and the bearing assembly 21 during operation can be correspondingly compensated in the tension relieving device 19. In order to achieve this, the elastic thrust element 6 is further stressed by rotating the nuts 9, 10 on the threaded section 22 of the strut 1, so that the average drive moment effective during operation can be compensated.

The dynamic behaviour of the centrifuge is improved, since the V-belt pulleys can be exactly oriented to one another, and there is no tipping moment affecting the support bearing.

According to the invention, the belt tension forces necessary for driving the centrifuge basket are compensated by a springing counter-force. The counter-force acts in the axis of symmetry of the belt drive between the drive unit and the centrifuge basket. Advantageously thereby, the tensioning forces generated by the belt drive cannot act on the elastic centrifuge basket support (bearing assembly). Thus, the centrifuge basket is located in the non-loaded neutral position in its operating condition, in other words during continuous centrifuge operation. Therefore, dislocation displacements of the rotating centrifuge basket relative to the stationary centrifuge inlet do not arise. As a result, sealing problems between the centrifuge basket and the centrifuge inlet or the centrifuge housing also do not arise. For this reason, it is quite simply possible to use a rotating product distributor with a stationary system hood as disclosed in U.S. Pat. No. 5,244,502 (Schaper et al.) which is highly facilitated with the tension relief according to the invention.

Although the invention has been described with reference to specific example embodiments, it will be appreciated that it is intended to cover all modifications and equivalents within the scope of the appended claims.

What is claimed is:

1. A centrifuge comprising a centrifuge basket unit including a centrifuge basket and an elastically supported centrifuge basket support unit, a drive unit, an endless drive arrangement connecting said drive unit to said centrifuge basket unit for drive transmission thereto and including an endless drive element and plural deflection guide means for said endless drive element, and a tension relieving device for opposing tension forces caused by said endless drive arrangement, wherein said endless drive element extends between said plural deflection guide means along a plane passing through said plural deflection guide means, and wherein said tension relieving device comprises an elastic thrust element and is arranged to extend between said plural deflection guide means and along said plane.

2. The centrifuge of claim 1, wherein said elastic thrust element comprises a compression spring.

3. The centrifuge of claim 1, wherein said elastic thrust element comprises a rubber spring member.

4. The centrifuge of claim 2, wherein said compression spring is a helical spring.

5. The centrifuge of claim 2, wherein said elastic thrust element comprises a compression spring packet including a plurality of said compression springs.

6. The centrifuge of claim 5, wherein said endless drive element comprises a drive belt.

7. The centrifuge of claim 1, wherein said endless drive element comprises a drive belt.

8. The centrifuge of claim 7, wherein said drive unit comprises a drive motor with an output shaft, said centrifuge basket support unit comprises a basket support member and a driven shaft, and said deflection guide means comprise a drive pulley mounted on said motor output shaft and a driven pulley mounted on said driven shaft.

9. The centrifuge of claim 8, wherein said basket support member is mounted directly and rigidly on said driven shaft without any intervening universal-joint and without any intervening intermediate shaft between said driven pulley and said driven shaft and said basket support member.

10. The centrifuge of claim 1, wherein said tension relieving device further comprises a strut, of which a first end is connected to said drive unit and of which a second end is connected to said elastic thrust element, which is further connected to said elastically supported basket support unit.

11. The centrifuge of claim 10, wherein said strut has an adjustable axial length.

12. The centrifuge of claim 11, wherein said strut includes a threaded rod section at said first end and two nuts threaded onto said threaded rod section, and wherein said drive unit includes a connecting bracket that is received between said two nuts.

13. The centrifuge of claim 10, including only a single one of said struts, wherein said drive unit includes a drive shaft, said centrifuge basket support unit includes a driven shaft, and said deflection guide means include a drive wheel mounted on said drive shaft and a driven wheel mounted on said driven shaft, and wherein said single strut is arranged to extend along a line defined by an intersection of a first plane parallel to and respectively extending along an axis of said drive shaft and an axis of said driven shaft, and a second plane passing through said drive wheel perpendicularly to said axis of said drive shaft and passing through said driven wheel perpendicularly to said axis of said driven shaft.

14. The centrifuge of claim 10, further comprising an intermediate support bearing member slidably supporting said strut at a position along the length of said strut between said first end and said second end.

15. The centrifuge of claim 14, wherein said intermediate support bearing member is connected to said centrifuge basket support unit and supports said strut nearer said second end than said first end.

16. The centrifuge of claim 14, wherein said intermediate support bearing member engages said strut against rotation about a lengthwise axis of said strut.

17. The centrifuge of claim 16, wherein said strut has an axially extending first groove therein, and wherein said intermediate support bearing member comprises a slide bearing sleeve having an axially extending second groove therein aligned with said first groove and comprises a spring member arranged between and engaging into said first groove and said second groove.

18. The centrifuge of claim 10, wherein said strut and said elastic thrust element are pre-stressed so that said elastically supported centrifuge basket support unit is not in a neutral position when said centrifuge is at rest and is in a neutral position when said centrifuge is operating.

19. The centrifuge of claim 1, wherein said drive unit is slidably movably arranged relative to said basket support unit to allow a tensioning adjustment of said endless drive element.

20. The centrifuge of claim 1, further comprising elastic suspension members elastically supporting said basket support unit to allow said basket to move in all degrees of freedom of motion.

21. A centrifuge comprising:

an elastically supported centrifuge basket unit, a drive unit, an endless drive arrangement connecting said drive unit to said centrifuge basket unit for drive transmission thereto and including an endless drive element and plural deflection guide means for said endless drive element, and a tension relieving device for tension forces caused by said endless drive arrangement, wherein:

said tension relieving device is arranged to extend along a plane alone which said endless drive element extends between said deflection guide means, and comprises an elastic thrust element, said endless drive element comprises a drive belt, said drive unit comprises a drive motor with an output shaft, said centrifuge basket unit comprises a basket support member and a driven shaft, said deflection guide means comprise a drive pulley mounted on said output shaft and a driven pulley mounted on said driven shaft, and said basket support member is mounted directly and rigidly on said driven shaft without any intervening universal-joint and without any intervening intermediate shaft between said driven pulley and said driven shaft and said basket support member.

22. A centrifuge comprising a frame, a centrifuge basket on a shaft that is elastically and rotatably supported relative to said frame, a drive motor having a drive shaft, a drive wheel connected to said drive shaft of said motor for rotation therewith, a driven wheel connected to said shaft of said basket for rotation therewith, an endless loop drive element mounted on said drive wheel and said driven wheel and extending therebetween along a plane passing through said drive wheel and said driven wheel perpendicularly to said drive shaft and said shaft of said basket, and a tension relieving device that comprises an elastically compressible thrust element connected for force transmission between said drive motor and said shaft of said centrifuge basket, and that is arranged extending axially along a line between said drive wheel and said driven wheel in said plane, wherein said endless loop drive element applies a tension force that is effective between said drive wheel and said driven wheel in said plane, and said tension relieving device applies a thrust force that is effective between said drive wheel and said driven wheel in said plane and counters said tension force.

23. The centrifuge of claim 22, further comprising elastic support members elastically supporting said shaft of said centrifuge basket relative to said frame such that said centrifuge basket can move elastically in all directions of motion.

* * * * *

UNITED STATES PATENT AND TRADEMARK OFFICE
CERTIFICATE OF CORRECTION

PATENT NO. : 5,746,915

DATED : May 5, 1998

INVENTOR(S) : Ebeling

It is certified that error appears in the above-identified patent and that said Letters Patent is hereby corrected as shown below:

Col. 8, line 7 (actual line count), after "plane" replace "alone" by --along--.

Signed and Sealed this

Fourteenth Day of July, 1998

*Attest:*

BRUCE LEHMAN

*Attesting Officer*

*Commissioner of Patents and Trademarks*